(12) United States Patent
Gamroth et al.

(10) Patent No.: US 12,027,855 B2
(45) Date of Patent: Jul. 2, 2024

(54) SYSTEMS AND METHODS FOR MONITORING AND CONTROLLING OUTLET POWER

(71) Applicant: Johnson Controls Technology Company, Auburn Hills, MI (US)

(72) Inventors: Timothy C. Gamroth, Dousman, WI (US); Joseph Piccolo, III, Fitzwilliam, NH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 619 days.

(21) Appl. No.: 17/070,344

(22) Filed: Oct. 14, 2020

(65) Prior Publication Data

US 2021/0028648 A1 Jan. 28, 2021

Related U.S. Application Data

(63) Continuation-in-part of application No. 16/381,833, filed on Apr. 11, 2019, now abandoned.

(60) Provisional application No. 62/914,773, filed on Oct. 14, 2019.

(51) Int. Cl.
*H02J 13/00* (2006.01)
*H02J 3/00* (2006.01)
*H02J 9/06* (2006.01)

(52) U.S. Cl.
CPC .......... *H02J 13/0005* (2020.01); *H02J 3/001* (2020.01); *H02J 9/061* (2013.01); *H02J 13/00002* (2020.01); *H02J 13/00006* (2020.01)

(58) Field of Classification Search
CPC ....................................................... G06F 1/26
See application file for complete search history.

(56) References Cited

U.S. PATENT DOCUMENTS

| | | | |
|---|---|---|---|
| 7,141,891 B2 * | 11/2006 | McNally | H05K 7/1457 307/41 |
| 8,941,269 B1 * | 1/2015 | Flegel | H02H 3/066 307/115 |
| 10,508,822 B1 | 12/2019 | Sheikh et al. | |
| RE48,835 E * | 11/2021 | Martin | G06F 11/2089 |
| 2010/0246101 A1 | 9/2010 | Deokar et al. | |
| 2012/0161752 A1 | 6/2012 | Spooner | |
| 2014/0300489 A1 | 10/2014 | Rice | |
| 2015/0100166 A1 * | 4/2015 | Baynes | H04N 21/4227 700/297 |
| 2015/0316907 A1 | 11/2015 | Elbsat et al. | |
| 2019/0107817 A1 | 4/2019 | Gordon et al. | |
| 2019/0179276 A1 | 6/2019 | Asp et al. | |
| 2020/0326677 A1 | 10/2020 | Gamroth et al. | |

* cited by examiner

*Primary Examiner* — Paul B Yanchus, III
(74) *Attorney, Agent, or Firm* — Foley & Lardner LLP

(57) ABSTRACT

A power outlet control device includes at least one electrical outlet and a processing circuit comprising a processor and memory storing instructions that, when executed by the processor, cause the processor to perform operations. The operations include monitoring external power supplied to the power outlet control device, detecting one or more powerline events based on the external power supplied to the power outlet control device, and automatically controlling an amount of power supplied to the at least one electrical outlet based on the one or more powerline events.

19 Claims, 8 Drawing Sheets

SYSTEMS AND METHODS FOR MONITORING AND CONTROLLING OUTLET POWER

CROSS-REFERENCE TO RELATED PATENT APPLICATIONS

This application is a continuation-in-part of U.S. application Ser. No. 16/381,833, filed Apr. 11, 2019, the entire disclosure of which is incorporated by reference herein. This application also claims the benefit of and priority to U.S. Provisional Application No. 62/914,773, filed Oct. 14, 2019, the entire disclosure of which is also incorporated by reference herein.

BACKGROUND

The present disclosure relates generally to methods for managing power consumed by various devices included in a building. Many devices used on a day-to-day basis required electrical power to operate and are, therefore, plugged into wall outlets to receive the desired power for operation. Wall outlets can include various features such as wireless communication with external devices, power consumption measurement, ground fault circuit interrupters, and arc fault circuit interrupters.

Power anomalies, such as a power surge, a power outage, or substandard power quality, can damage the devices that are plugged into such wall outlets. It would be advantageous to provide a wall outlet that can minimize damage to the devices due to power anomalies.

SUMMARY

One implementation of the present disclosure is a power outlet control device, according to some embodiments. In some embodiments, the power outlet control device includes at least one electrical outlet, and a processing circuit. In some embodiments, the processing circuit includes a processor and memory storing instructions that, when executed by the processor, cause the processor to perform operations. In some embodiments, the operations include monitoring external power supplied to the power outlet control device. In some embodiments, the operations include detecting one or more powerline events based on the external power supplied to the power outlet control device. In some embodiments, the operations include automatically controlling an amount of power supplied to the at least one electrical outlet based on the one or more powerline events.

In some embodiments, the power outlet control device further includes a backup battery configured to provide a backup source of power to the power outlet control device.

In some embodiments, detecting the one or more powerline events includes detecting a substandard power quality characteristic of the external power based on at least one of the voltage characteristic and the frequency characteristic.

In some embodiments, the one or more powerline events include a power outage.

In some embodiments, the power outlet control device is further configured to restore power to the at least one electrical outlet based on a power restoration schedule.

In some embodiments, the operations further include communicating with one or more other power outlet control devices to generate the power restoration schedule. In some embodiments, the power restoration schedule defines an order in which the power outlet control device restores power to the at least one electrical outlet relative the one or more other power outlet control devices.

Another implementation of the present disclosure is a power outlet control device, according to some embodiments. In some embodiments, the power outlet control device includes at least one electrical outlet and a processing circuit. In some embodiments, the processing circuit includes a processor and memory storing instructions that, when executed by the processor, cause the processor to perform operations. In some embodiments, the operations include monitoring power consumed by one or more devices coupled to the at least one electrical outlet. In some embodiments, the operations include detecting one or more outlet anomalies based on the power consumed by the one or more devices coupled to the at least one electrical outlet. In some embodiments, the operations include automatically controlling an amount of power supplied to the one or more devices via the at least one electrical outlet based on the one or more outlet anomalies.

In some embodiments, detecting the one or more outlet anomalies includes detecting a particular device coupled to the at least one electrical outlet consuming an idle amount of power and automatically disabling the power supplied to the particular device via the at least one electrical outlet.

In some embodiments, the operations further include measuring the amount of power consumed by the one or more devices coupled to the at least one electrical outlet and transmitting the measured amount of power to a building management system.

In some embodiments, measuring the amount of power consumed by the one or more devices includes detecting that a particular device of the one or more devices is consuming an excess amount of power and automatically disabling the power supplied to the particular device via the at least one electrical outlet.

In some embodiments, monitoring the power consumed by the one or more devices includes collecting an electrical signature for a device coupled to the at least one electrical outlet to identify the one or more devices.

In some embodiments, detecting the one or more outlet anomalies includes detecting a prohibited device coupled to the at least one electrical outlet based on the collected signature for the prohibited device and automatically disabling the power supplied to the prohibited device via the at least one electrical outlet.

In some embodiments, detecting the one or more outlet anomalies includes detecting a short circuit in a device coupled to the at least one electrical outlet based on the power consumed by the device and automatically disabling the power supplied to the at least one electrical outlet to which the short circuited device is coupled.

Another implementation of the present disclosure is a power outlet control device, according to some embodiments. In some embodiments, the power outlet control device includes at least one electrical outlet and a processing circuit. In some embodiments, the processing circuit includes a processor and memory storing instructions that, when executed by the processor, cause the processor to perform operations. In some embodiments, the operations include determining that power supplied to the at least one electrical outlet is disabled and communicating with one or more other power outlet control devices. In some embodiments, the operations include obtaining a power restoration schedule defining a sequence in which the power outlet control device and the one or more other power outlet control devices restore power supplied to the at least one electrical outlet and one or more other electrical outlets of the one or more other power outlet control devices. In some embodiments, the operations include automatically restoring power supplied to the at least one electrical outlet in coordination with the one or more other power outlet control devices based on the power restoration schedule.

In some embodiments, communicating with the one or more other power outlet control devices includes transmitting power consumption measurements of one or more devices coupled to the at least one electrical outlet.

In some embodiments, the operations further include generating the power restoration schedule based on one or more power consumption measurements from the power outlet control device and the one or more other power outlet control devices.

In some embodiments, generating the power restoration schedule includes ranking the at least one electrical outlet and the one or more other electrical outlets based on the one or more power consumption measurements and generating the sequence based on the ranking.

In some embodiments, automatically restoring power includes ramping up the power supplied to the at least one electrical outlet based on the restoration schedule.

In some embodiments, determining that power supplied to the at least one electrical outlet is disabled includes detecting a power outage in external power supplied to the power outlet control device.

In some embodiments, automatically restoring power supplied to the at least one electrical outlet based on the power restoration schedule is performed in response to determining that the external power supplied to the power outlet control device has been restored.

DETAILED DESCRIPTION

Overview

Referring generally to the FIGURES, systems and methods for monitoring and controlling power supplied to devices via power outlets are shown, according to various exemplary embodiments. A power outlet control device (PCD) includes a powerline analyzer and an outlet administrator, according to some embodiments. In some embodiments, the powerline analyzer is configured to monitor and control power that is supplied by an external power source to the PCD. In some embodiments, the outlet administrator is configured to monitor and control the supplied power that is transmitted to one or more electrical outlets provided by the PCD and consumed by various devices electrically coupled to the one or more electrical outlets.

The powerline analyzer is configured to detect a powerline event involving changes in the quality of power supplied to the PCD, according to some embodiments. In some embodiments, the changes in the quality of power are an increase or decrease of the current, frequency, and/or voltage of the supplied power. In such embodiments, the powerline analyzer is configured to generate a powerline signal comprising information associated with the powerline event. The powerline analyzer transmits the powerline signal to the outlet administrator for use in determining power decisions. Such power decisions may comprise disabling power transmitted to the PCD, enabling power to the PCD, and/or taking no action.

The outlet administrator is configured to monitor and control power supplied to various devices plugged into the one or more electrical outlets provided by the PCD, according to some embodiments. In some embodiments, the outlet administrator is configured to monitor for short circuits based on the power consumed by a device, determine a location of the shorted circuit, and deny power transmission to a location of the shorted circuit until properly fixed. In some embodiments, outlet administrator is configured to determine, based on an electrical signature, an identity of each device that is electrically coupled to a building power supply. In such embodiments, outlet administrator is configured to determine a prohibited device based on the electrical signature.

Before discussing the FIGURES in detail, it should be noted that the examples provided in the present disclosure are illustrative only and are not limitations on the scope of invention.

Building and Building Management System

Figure 1A:
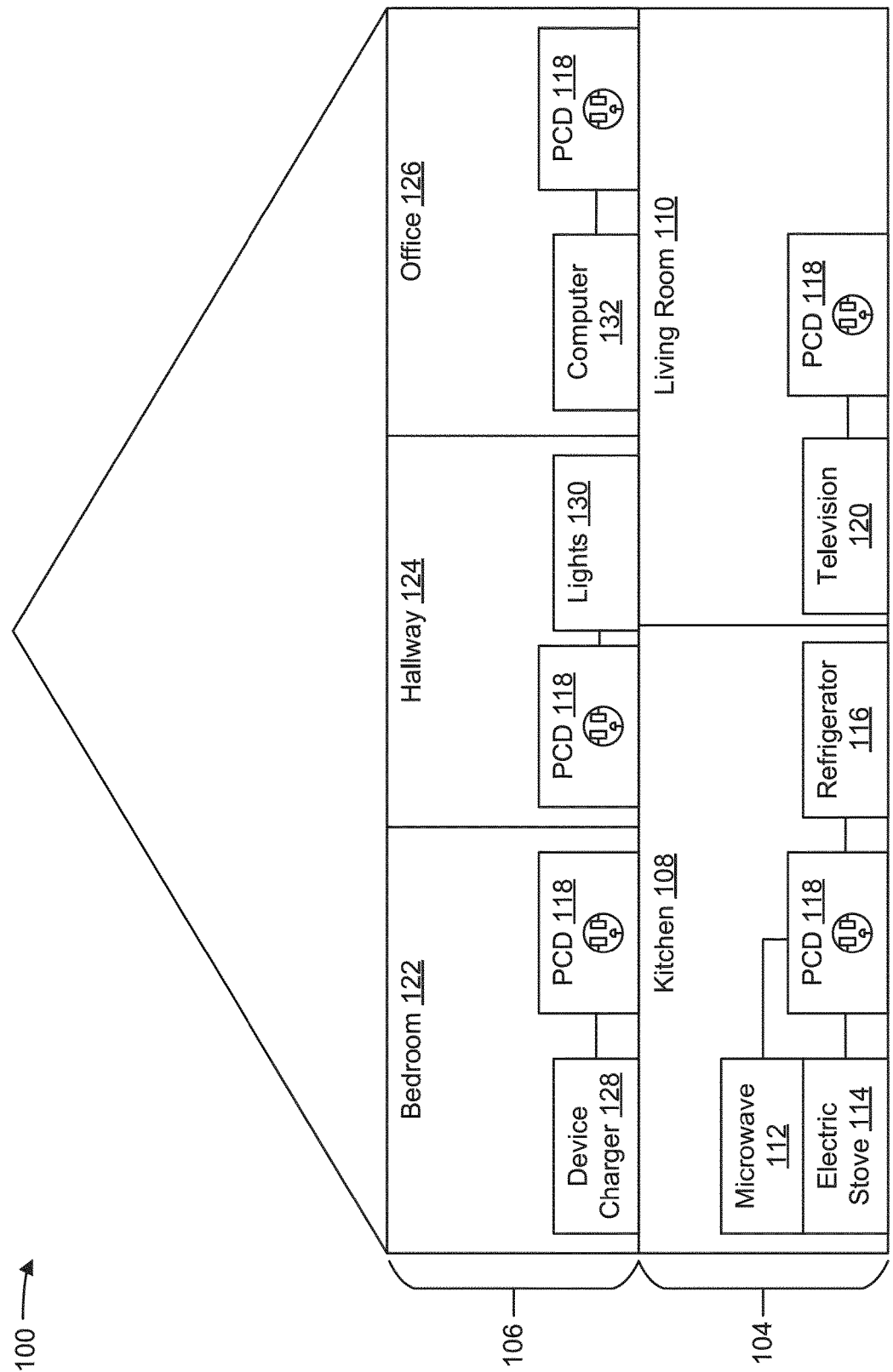
FIG. 1A is a building equipped with a power outlet control device (PCD), according to some embodiments.

Referring to FIG. 1A, a view of a building 100 is shown, according to some embodiments. For exemplary purposes, building 100 is shown as a residential house. However, it should be understood that building 100 may include any type of building such as a residential building (e.g., a house, an apartment building, etc.), a commercial building (e.g., an office building, a restaurant, a retailer, etc.), a public building (e.g., a school, a government building, a museum, etc.), etc. In some embodiments, building 100 is served by a building management system (BMS). As will be described in greater detail with reference to FIG. 2, a BMS is, in general, a system of devices configured to control, monitor, and/or manage equipment in or around a building or building area. A BMS can include, for example, a HVAC system, a security system, a lighting system, a fire alerting system, and any other system that is capable of managing building functions or devices, or any combination thereof. An example of a BMS which can be used to monitor and control building 100 is described in U.S. patent application Ser. No. 14/717,593 filed May 20, 2015, the entire disclosure of which is incorporated by reference herein.

Building 100 is shown to be divided into a first level 104 and a second level 106, according to some embodiments. First level 104 is shown to be further divided into a kitchen zone 108 and a living room zone 110, according to some embodiments. In some embodiments, kitchen zone 108 includes various devices such as a microwave 112, an electric stove 114, a refrigerator 116, and a power outlet control device (PCD) 118. Living room zone 110 is shown to include devices such as a television 120 and PCD 118, according to some embodiments. Second level 106 is shown to be further divided into a bedroom zone 122, a hallway zone 124, and an office zone 126, according to some embodiments. In some embodiments, bedroom zone 122 includes a device charger 128 and PCD 118, hallway zone 124 includes PCD 118 and lights 130, and office zone 126 includes PCD 118 and a computer 132. As shown, each device previously stated is electrically coupled to the corresponding PCD 118 located in the corresponding zone and receives power (generated and supplied by an external power source) via PCD 118. Although each zone is shown to include a singular PCD 118, it should be understood that each zone may include more than one PCD 118. The features and operations performed by PCD 118 will be described in greater detail below.

In general, PCD 118 is a device providing points of electrical coupling (e.g., electrical outlets) and configured to monitor and control the power supplied to and transmitted therethrough to various external devices (e.g., device charger 128, computer 132, etc.) that are coupled (e.g., electrically, physically) to the points of electrical coupling, according to some embodiments. As will be described in greater detail with reference to FIGS. 3-9, in some embodiments, PCD 118 is configured to perform power diagnostics on the power transmitted to the one or more external devices that are coupled to PCD 118 to determine various characteristics such as an amount of power consumption by external devices via PCD 118, quality of power supplied to the external devices via PCD 118, etc. and/or events such as short circuits, power surges, etc. In addition, or alternatively, PCD 118 is configured to perform power diagnostics on the power that is supplied to PCD 118 from an external power source to determine various characteristics such as quality of power supplied to PCD 118 and/or events such as power outages. In some embodiments, PCD 118 monitors an amount of idle power (e.g., an amount of power consumed by an external device coupled to PCD 118 when not operating) and disables power transmission through PCD 118 to the points of electrical coupling, thereby reducing a cost of purchasing an amount of power when no external devices are coupled to PCD 118. In some embodiments, PCD 118 monitors power consumption by an external device that are electrically coupled to PCD 118 to determine an operating state (e.g., on, off, idling) of the device. In such embodiments, PCD 118 disables power transmission to the external device when it is determined that the external device is not operating (e.g., in an off state), thereby reducing the cost to purchase power that is transmitted to such an external device. Such power diagnostics performances may occur continuously or intermittently.

Each PCD 118 is also configured to determine a power restoration schedule following an event (such as a power outage) by communicating (e.g., via wireless communication, via powerline communication, etc.) with one or more other PCDs 118. For example, a first PCD 118, to which device charger 128 is coupled to, may first restore power. A second PCD 118, to which television 120 is connected to, communicates with the first PCD 118 to determine that the second PCD 118 will restore power following the power restoration to the first PCD 118. As such, the power restoration schedule is determined by a history and/or prediction of plug load of each of the PCDs 118. Alternatively, the power restoration schedule can be determined by user input, random generation, location of each PCD 118 with a building, etc. Advantageously, by determining a power restoration schedule, a surge in power that is restored to the one or more external devices is reduced allowing for minimal potential damage to the external devices that can be caused by a power surge.

In some embodiments, PCD 118 includes some or all of the components, features, and/or functionality of the plug-in sensory communication device described in U.S. patent application Ser. No. 16/381,833 filed Apr. 11, 2019, the entire disclosure of which is incorporated by reference herein. As will be described in greater detail with reference to FIG. 3, in some embodiments, PCD 118 is structured as a device operating as an outlet (e.g., PCD 118 replaces an existing outlet). That is, PCD 118 is directly and electrically coupled to an electrical system provided by a building (e.g., building 100). As such, PCD 118 may provide any type of attachment features or components (e.g., threaded fasteners, adhesive material) to secure a location of the PCD 118 to a wall, ceiling, floor, etc. within a zone. PCD 118 may also include any number of and type of relay, terminal, etc. to facilitate the electrical coupling of PCD 118 to the electrical system provided by the building. Alternatively, as will be described in greater detail with reference to FIGS. 4 & 5, PCD 118 is structured as a movable device configured to physically and electrically couple into a wall outlet. PCD 118 may provide any number of power plugs to facilitate the electrical and physical coupling of PCD 118 with a power outlet. Accordingly, PCD 118 may also provide any number of outlets to provide a point of electrical coupling to a building electrical system via the wall outlet.

Figure 1B:
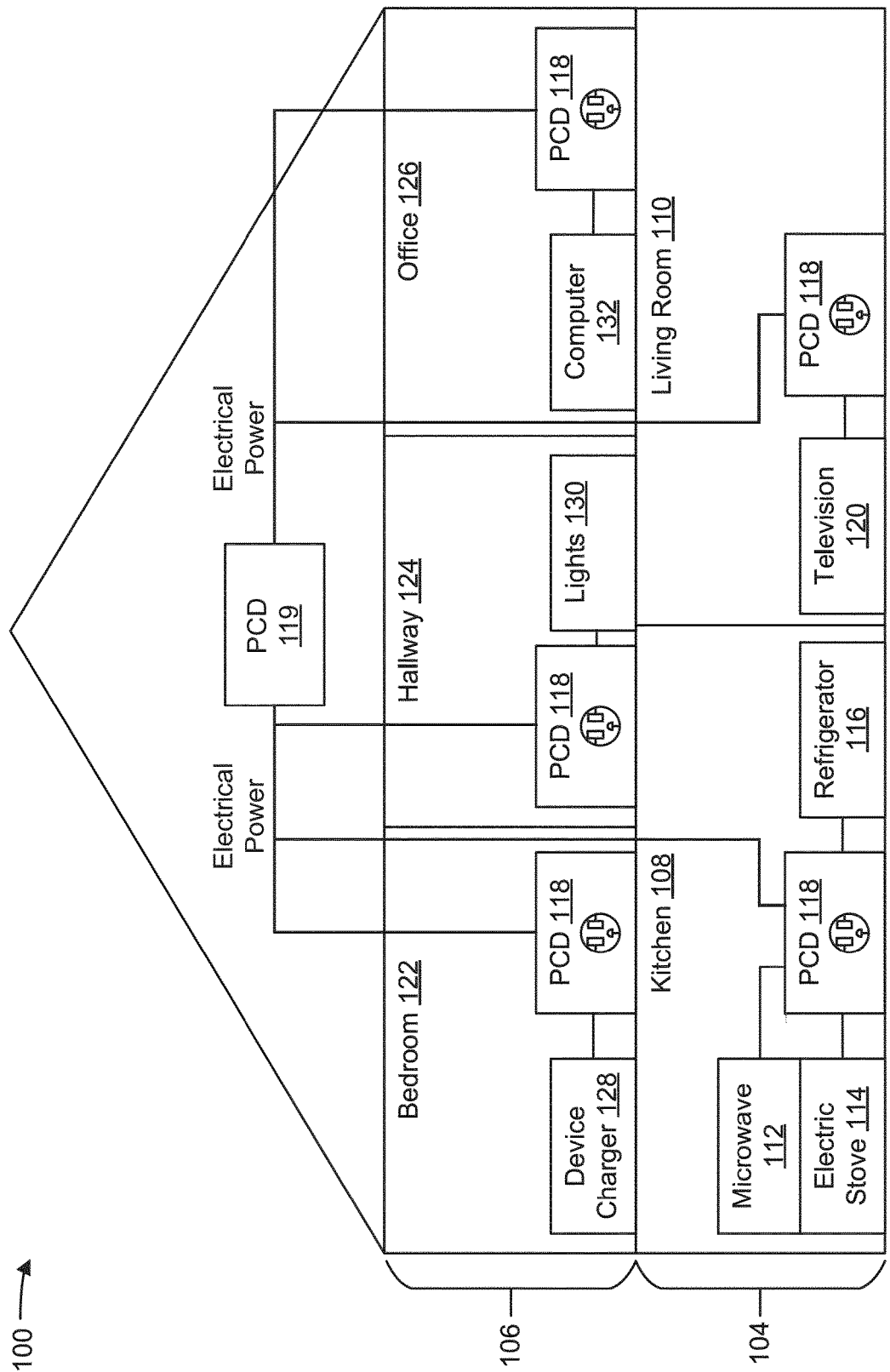
FIG. 1B is a building equipped with multiple PCDs and a PCD that functions as a smart circuit breaker, according to some embodiments.

Referring now to FIG. 1B, building 100 can include another PCD 119. PCD 119 can be the same as or similar to any of PCDs 118 and may include similar structure and/or be configured to perform similar functionality as PCDs 118. In some embodiments, any of PCDs 118 or PCD 119 are a smart circuit breaker. For example, any of the PCDs described herein can be configured to perform any of the functionality of the smart circuit breaker as described in U.S. application Ser. No. 16/215,791, filed Dec. 11, 2018, the entire disclosure of which is incorporated by reference herein.

When PCD 119 is configured as a smart breaker, PCD 119 can coordinate restoring power to multiple circuits of building 100 in a staged manner. For example, when a power line event causes a power outage and power returns, PCD 119 can activate one or more circuits or PCDs 118 of building 100 based on priority, in a staged manner. In this way, power can be returned to the building gradually in a staged manner.

PCD 119 may coordinate with other circuit breakers (e.g., other PCDs) in building 100 to determine that power supplied to one or more electrical outlets are disabled. PCD 119 may also coordinate or communicate with other circuit breakers to obtain a power restoration schedule that defines a sequence in which PCDs 118 restore power supplied to the electrical outlets and to automatically restore power according to the power restoration schedule. In some embodiments, PCD 119 coordinates with other circuit breakers or smart circuit breakers if building 100 includes multiple circuit breakers or multiple smart circuit breakers, or a combination thereof.

Figure 4:
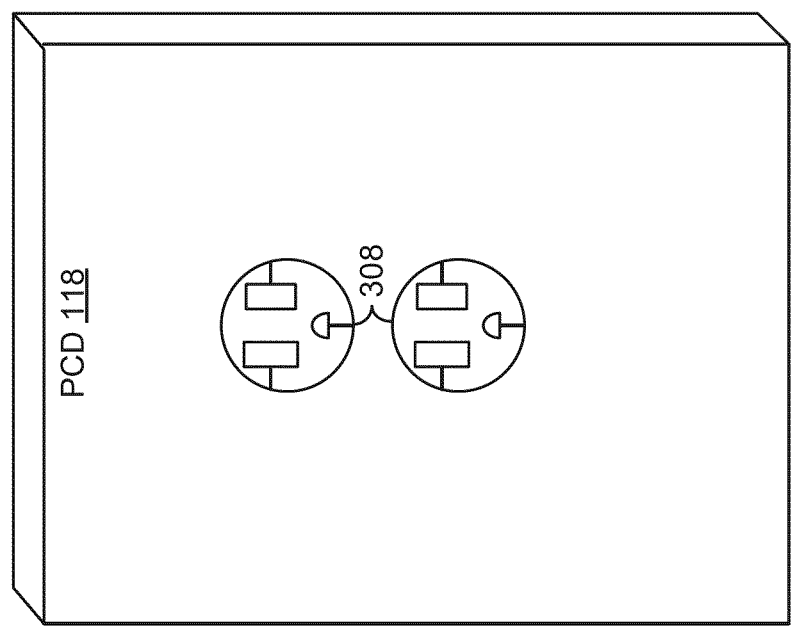
FIG. 4 is a schematic drawing illustrating a second embodiment of the PCD of FIGS. 1A-1B, according to some embodiments.
Figure 3:
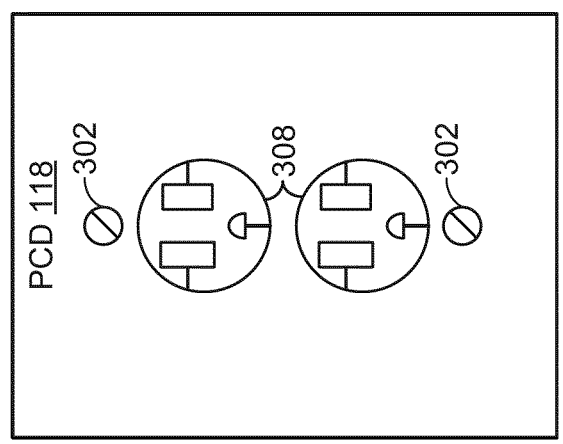
FIG. 3 is a schematic drawing illustrating a first embodiment of the PCD of FIGS. 1A-1B, according to some embodiments.

In some embodiments, PCD 119 can coordinate power restoration to different circuits of building 100 without coordinating or communicating with other circuit breakers. For example, PCD 119 may be a single circuit breaker of building 100 and can automatically restore power in the staged manner to PCDs 118 or the circuits of building 100. It should be understood that the term "power outlet control device" or "PCD" may refer to any smart outlets, circuit breakers, smart circuit breakers, etc., as described herein. It should also be understood that any "outlets," "electrical outlets," or "smart outlets" as described herein may be a 3-phase, single phase, etc., or any other type of electrical outlet. Electrical outlets of PCDs 118 may include standard wall outlets into which electrical devices can be plugged, as shown in FIGS. 3-4. Electrical outlets of PCD 119 may include electrical circuits controlled by PCD 119, each of which may provide electricity to one or more standard wall outlets, electrical devices (e.g., lights, appliances, building equipment, etc.), or PCDs 118 distributed throughout building 100.

Figure 2:
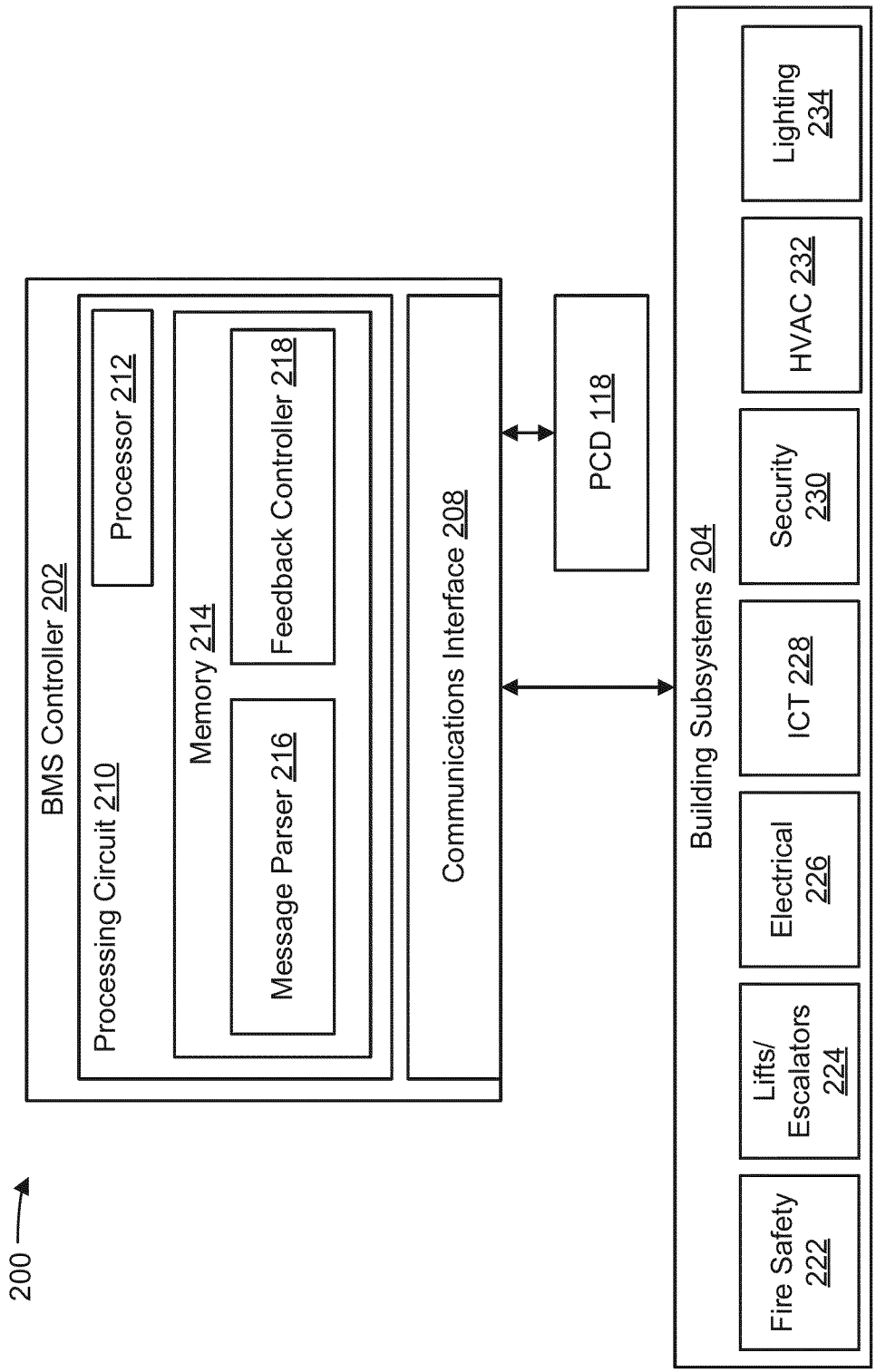
FIG. 2 is a block diagram illustrating a building management system (BMS) which can be implemented in the building of FIGS. 1A-1B, according to some embodiments.

Referring now to FIG. 2, a block diagram of a building management system (BMS) 200 is shown, according to an exemplary embodiment. BMS 200 may be implemented in a building (e.g., building 100) to automatically monitor and control various building functions. BMS 200 is shown to include BMS controller 202 and a plurality of building subsystems 204. Building subsystems 204 are shown to include a fire safety system 222, a lift/escalators subsystem 224, a building electrical subsystem 226, an information communication technology (ICT) subsystem 228, a security subsystem 230, a HVAC subsystem 232, and a lighting subsystem 234. In various embodiments, building subsystems 204 can include fewer, additional, or alternative subsystems. For example, building subsystems 204 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building.

Each of building subsystems 204 may include any number of devices, controllers, and connections for completing its individual functions and control activities. For example, HVAC subsystem 232 may include a chiller, a boiler, any number of air handling units, economizers, field controllers, supervisory controllers, actuators, temperature sensors, and other devices for controlling the temperature, humidity, airflow, or other variable conditions within a building. Lighting subsystem 234 may include any number of light fixtures, ballasts, lighting sensors, dimmers, or other devices configured to controllably adjust the amount of light provided to a building space. Security subsystem 230 may include occupancy sensors, video surveillance cameras, digital video recorders, video processing servers, intrusion detection devices, access control devices and servers, or other security-related devices.

BMS controller 202 is shown to communicate with PCD 118, according to some embodiments. In some embodiments, PCD 118 includes a sensor that monitors one or more environmental variables (e.g., humidity, temperature, occupancy, etc.). For example, PCD 118 may include a temperature sensor configured to collect temperature data and transmits the measured temperature data to BMS controller 202 for use in control processes. In some embodiments, PCD 118 may be capable of transmitting control data (e.g., temperature setpoints, humidity setpoints, etc.) generated based on collected environmental data to BMS controller 202. Control data may be any data which affects operation of the BMS 200. In some embodiments, control data may control building subsystems 204 through BMS controller 202. For example, PCD 118 may send a signal with a command to enable intrusion detection devices of security subsystem 230. In some embodiments, BMS controller 202 communicates with PCD 118 to collect various power characteristics such as power consumed by external devices with are connected to PCD 118, quality of power supplied to the external devices, etc. In some embodiments in which PCD 118 monitors an amount of power consumed by external devices that are electrically coupled to PCD 118, PCD 118 transmits the power consumption amount t0 BMS controller 202 for use in control algorithms for building subsystems 204.

BMS controller 206 also includes communications interface 208. Communications interface 208 may facilitate communication between BMS controller 202, building subsystems 204 (e.g., HVAC, lighting, security, lifts, power distribution, etc.), and/or PCD 118. Communications interface 208 can be or include wired or wireless communication interfaces (e.g., jacks, antennas, transmitters, receivers, transceivers, wire terminals, etc.) for conducting data communication with building subsystems 204, PCD 118, or other external systems or devices. In various embodiments, communication via communications interface 208 may be direct (e.g., local wired or wireless communication) or via a communication network (e.g., a WAN, the Internet, a cellular network, etc.). For example, communications interface 208 can include an Ethernet card and port for sending and receiving data via an Ethernet-based communication link or network. In another example, communications interface 208 can include a Wi-Fi transceiver for communicating via a wireless communication network. In yet another example, communications interface 208 may include cellular or mobile phone communication transceivers.

Still referring to FIG. 2, BMS controller 202 is shown to include a processing circuit 210. Processing circuit 210 includes a processor 212 and memory 214. Processor 212 can be implemented as a general-purpose processor, an application specific integrated circuit (ASIC), one or more field programmable gate arrays (FPGAs), a group of processing components, or other suitable electronic processing components.

Memory 214 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 214 may be or include volatile memory or non-volatile memory. Memory 214 may include database components, object code components, script components, or any other type of information structure for supporting the various activities and information structures described in the present application. According to an exemplary embodiment, memory 214 is communicably coupled to processor 212 via processing circuit 210 and includes computer code for executing (e.g., by processing circuit 210 and/or processor 212) one or more processes described herein.

In some embodiments, BMS controller 202 is implemented within a single computer (e.g., one server, one housing, etc.). In various other embodiments, BMS controller 202 may be distributed across multiple servers or computers (e.g., that can exist in distributed locations). For example, BMS controller 202 may be implemented as part of a METASYS® brand building automation system, as sold by Johnson Controls Inc. In other embodiments, BMS controller 202 may be a component of a remote computing system or cloud-based computing system configured to receive and process data from one or more building management systems. For example, BMS controller 202 may be implemented as part of a PANOPTIX® brand building efficiency platform, as sold by Johnson Controls Inc. In other embodiments, BMS controller 202 may be a component of a subsystem level controller (e.g., a HVAC controller), a subplant controller, a device controller (e.g., a chiller controller, etc.), a field controller, a computer workstation, a client device, or any other system or device that receives and processes data.

Still referring to FIG. 2, memory 214 is shown to include a message parser 216 and a feedback controller 218. Message parser 216 and feedback controller 218 may be configured to receive inputs from building subsystems 204, PCD 118, and other data sources, determine optimal control actions for building subsystems 204 based on the inputs, generate control signals based on the optimal control actions, and provide the generated control signals to building subsystems 204.

Message parser 216 may be configured to parse data received by BMS controller 202. For example, a message containing multiple data values (e.g., measured values) may be received by BMS controller 202 from one or more sensors included in building subsystems 204. Message parser 216 may be configured to parse the message and extract the multiple data values. Message parser 216 may provide one value at a time to feedback controller 218. In yet other embodiments, message parser 216 may provide only values of a certain type to feedback controller 218. For example, message parser 216 may only provide measured values to feedback controller 218 In some embodiments, message parser 216 can work with feedback controller 218 to optimize building performance (e.g., efficiency, energy use, comfort, or safety) based on inputs received at communications interface 208.

Power Outlet Control Device

Referring now to FIG. 3, a schematic drawing illustrating a first embodiment of PCD 118 is shown, according to some embodiments. The embodiment illustrated by FIG. 3 shows PCD 118 structured as a device configured for attachment to a structure (e.g., a wall, a ceiling, a floor) and direct electrical coupling to a building electrical system via a terminal included in PCD 118. In such an embodiment, the device may be installed to the structure via one or more attachment features 302. Such attachment features may include threaded fasteners, adhesive materials, etc. The electrical outlets 308 provided by PCD 118 can be electrically coupled to the building electrical systems via one or more connection points (e.g., terminals). The embodiment illustrated in FIG. 3 shows PCD 118 as a device that is directly coupled to the electrical system of a building. As such, PCD 118 may be used in lieu of standard wall outlets that do not provide the features disclosed herein.

Figure 5:
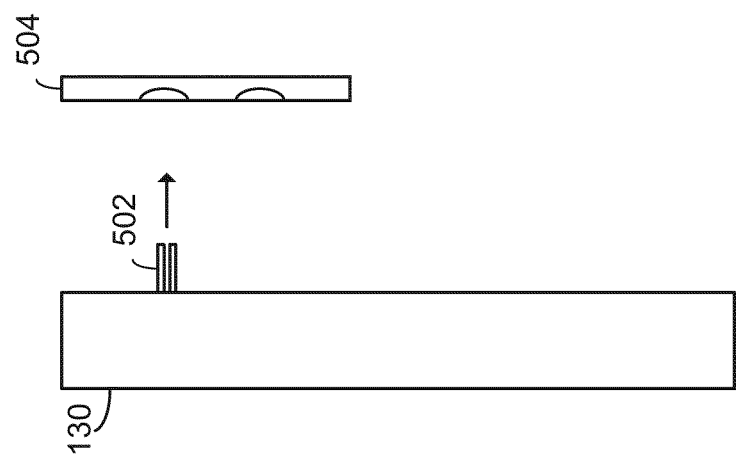
FIG. 5 is a schematic drawing illustrating the installation of the second embodiment of the PCD of FIG. 4, according to some embodiments.

Referring now to FIG. 4, a schematic drawing illustrating a second embodiment of PCD 118 is shown, according to some embodiments. As shown, PCD 118 includes one or more electrical outlets 308 configured to provide a point of electrical coupling to one or more external devices. The embodiment illustrated by FIG. 4 shows PCD 118 structured as a movable device that can be electrically coupled to a building electrical system via a wall outlet. A movable device may be plugged into a first wall outlet, unplugged from the first wall outlet, and plugged into a second wall outlet. As shown in FIG. 5, PCD 118 can be electrically coupled to a building electrical system by a coupling an electrical interface 502 (which may be structured as one or more power plugs) into a wall outlet 504. Upon coupling of PCD 118 to wall outlet 504, PCD 118 may receive power from wall outlet 504 and transmit such power to one or more external devices that are plugged into the electrical outlets 308.

As discussed above, PCD 119 may include some or all of the same components as PCD 118. The components of PCD 119 may be configured to perform the same or similar functions as described with reference to PCD 118. Accordingly, it should be understood that some or all of the description and/or illustration of PCD 118 and the components thereof provided in the present disclosure applies to PCD 119 as well. Additionally, any references to PCD 118 in the present disclosure should be understood as referring to PCD 119 as well, unless differences in structure or functionality of PCD 119 are explicitly noted in the corresponding description. For example, electrical interface 502 in PCD 119 may include an input power connection at which PCD 119 receives electricity from a main power line of building 100 or from an electric utility, whereas electrical interface 502 of PCD 118 may resemble power plugs as shown in FIG. 5.

Figure 6:
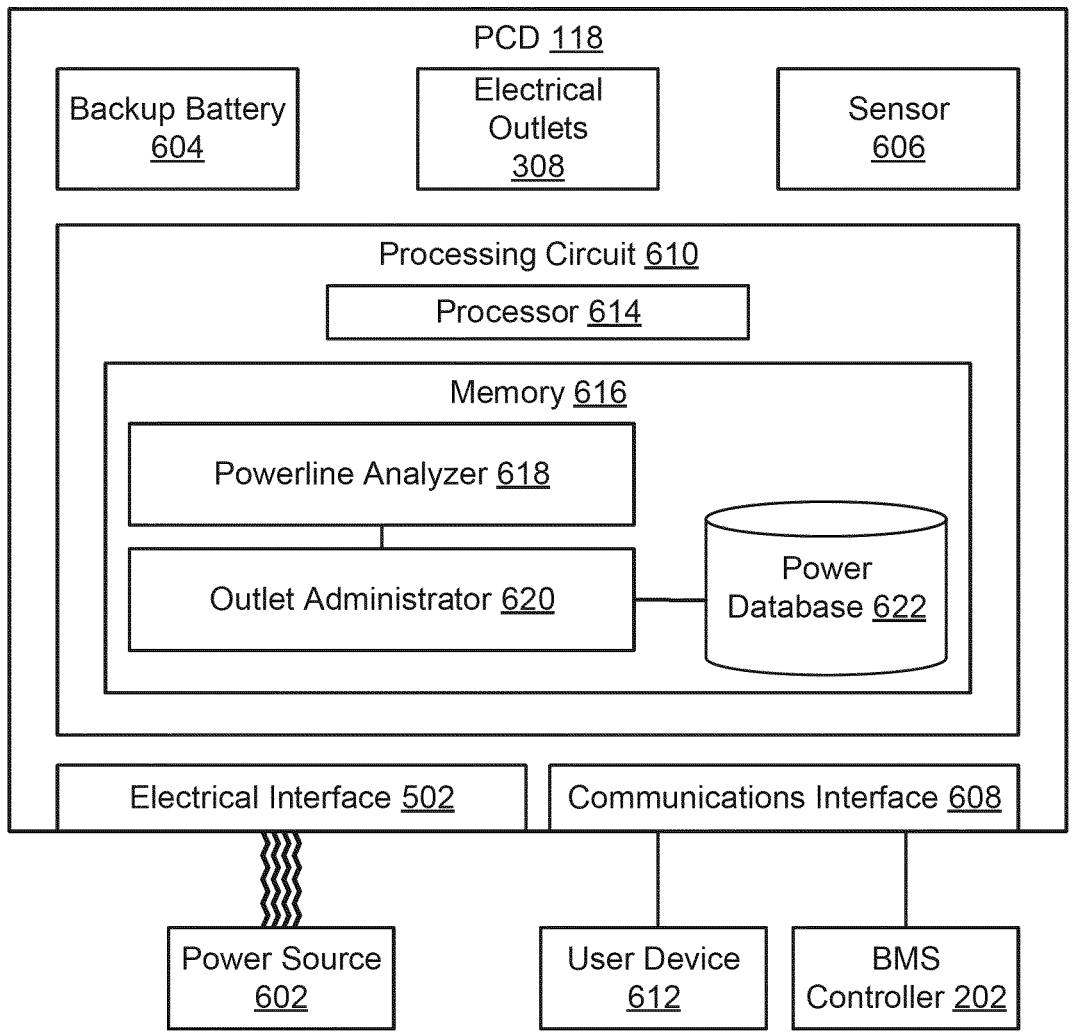
FIG. 6 is a block diagram illustrating a powerline control device which can be implemented in the building of FIGS. 1A-1B and/or used in conjunction with the BMS system of FIG. 2, according to some embodiments.

Referring now to FIG. 6, a block diagram illustrating PCD 118 in greater detail is shown, according to an exemplary embodiment. PCD 118 is shown to be electrically coupled to a power source 602 via electrical interface 502, according to some embodiments. Power source 602 may provide power to a building via a building electrical system. Such power may be generated by any one of an electrical utility, a building power plant, a generator, etc. As previously described, electrical interface 502 may be one or more terminals configured to couple PCD 118 to a building electrical system or one or more power plugs (as shown in FIG. 5) configured to coupled PCD 118 to a wall outlet (e.g., wall outlet 504).

PCD 118 is shown to include electrical interface 502, a backup battery 604, electrical outlets 308, a sensor 606, a communications interface 608, and a processing circuit 610. In some embodiments, PCD 118 may include additional components (e.g., a user interface, control buttons/switches, lights, etc.). In other embodiments, PCD 118 may include fewer or any combination of components. In some embodiments, PCD 118 may include ports allowing for the installation of additional modules (e.g., additional sensors, lights, processors, etc.).

Backup battery 604 is any source of power (e.g., chemical, renewable, etc.) that is capable of providing a source of power if power supplied by an external power source is not available (e.g., a power line event causing a power outage, etc.), according to some embodiments. In some embodiments, processing circuit 610 may be capable of detecting when power supplied by an external power source is not available. In such embodiments, processing circuit 610 is capable of activating backup battery 604 (e.g., turn on) in order to power PCD 18. In such embodiments, as will be described in greater detail below, the power supplied by backup battery 604 is consumed by PCD 118 to slowly restore (e.g., ramp up) power supplied to electrical outlets 308 upon restoration of power supplied by the external power source. Ramping up power may include gradually increasing an amount of power supplied to electrical outlets 308. Advantageously, by slowly restoring electrical outlet loads upon restoration of power, electrical damage caused by a sudden power surge can be substantially prevented.

Electrical outlets 308 are shown to be included as a component of PCD 118 and can be located on an external surface of a housing that encases PCD 118, according to some embodiments. Electrical outlets 308 may be capable of providing a point of electrical connection of PCD 118 to an external power source in order to supply external devices with power supplied by the external power source. In some embodiments, PCD 118 may include additional electrical outlets 308 (e.g., more than two). In other embodiments, PCD 118 includes fewer electrical outlets 308 (e.g., less than two). The shape and/or structure (e.g., two prong, three prong, etc.) may be configurable. In PCD 119, electrical outlets 308 may be electrical connections of PCD 119 that provide electricity to various electric circuits within building 100 (e.g., to standard wall outlets, to PCDs 118, to building equipment, etc.). Accordingly, the term "electrical outlets" should be understood as encompassing not only the embodiments of electrical outlets 308 of PCD 118 shown in FIGS. 3-4 (e.g., outlets resembling standard wall outlets into which a plug can be inserted), but also electrical connections that function to "outlet" (e.g., deliver, provide, output, etc.) electricity from PCD 119 to various electric circuits within building 100.

Sensor 606 is shown to be included as a component of PCD 118 and can be located on or within a housing that encases PCD 118, according to some embodiments. In some embodiments, sensor 606 is any device capable of measuring an environment variable (e.g., temperature, humidity, occupancy, pressure, air quality, carbon monoxide, smoke, etc.). For example, sensor 606 may be a temperature sensor capable of measuring temperature of a zone. In some embodiments, sensor 606 may include additional sensors capable of measuring different environmental variables. In some embodiments, sensor 606 may be capable of outputting data containing a measurement of an environmental variable to BMS controller 202.

Communications interface 608 is shown to facilitate communications between PCD 118, a user device 612, and BMS controller 202, according to some embodiments. Communications interface 608 may include wired or wireless interfaces (e.g., jacks, antennas, transmitters, receivers, transceivers, wire terminals, etc.) for conducting data communications with various systems, devices, or networks. For example, communications interface 608 may include an Ethernet card and port for sending and receiving data via an Ethernet-based communications network and/or a Wi-Fi transceiver for communicating via a wireless communications network. Communications interface 608 may be configured to communicate via local area networks or wide area networks (e.g., the Internet, a building WAN, etc.) and may use a variety of communications protocols (e.g., BACnet, IP, LON, etc.). Communications interface 608 may be a network interface configured to facilitate electronic data communications between PCD 118 and various external systems or devices (e.g., BMS controller 202, user device 612, etc.). Although communications interface 608 and electrical interface 502 are shown as two separate interfaces, in some embodiments, communications interface 608 and electrical interface 502 may be provided as a single interface configured to electrically couple PCD 118 to power source 602 and facilitate communications between PCD 118 and one or more other PCDs 118 via powerline communications. In such embodiments, communications may be wireless and/or via power line communications conducted via a power line (e.g., a wiring system) provided by a building electrical system.

User device 612 includes any type of computing device that may be used to facilitate user input to PCD 118 and/or receive information from PCD 118. In this regard, user device 612 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The user device 612 may also include any type of mobile device including, but not limited to, a phone (e.g., smart phone), table, personal digital assistant, and/or computing devices (e.g., desktop computer, laptop computer, personal digital assistant).

Processing circuit 610 is shown to include a processor 614 and memory 616, according to some embodiments. In some embodiments, processing circuit 314 may be capable of processing relating to the operation of PCD 118. Processor 614 can be implemented as a general-purpose processor, an application specific integrated circuit (ASIC), one or more field programmable gate arrays (FPGAs), a group of processing components, or other suitable electronic processing components. Processor 614 may be configured to execute computer code or instructions stored in memory 616 or received from other computer readable media (e.g., CDROM, network storage, a remote server, etc.).

Memory 616 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 616 may be or include volatile memory or non-volatile memory. Memory 320 may include database components, object code components, script components, or any other type of information structure for supporting the various activities and information structures described in the present application. According to an exemplary embodiment, memory 320 is communicably connected to processor 614 via processing circuit 314 and includes computer code for executing (e.g., by processing circuit 610 and/or processor 614) one or more processes described herein.

Processing circuit 610 is also shown to include a powerline analyzer 618, an outlet administrator 620, and a power database 622, according to some embodiments. As will be described in greater detail with reference to FIG. 8, in some embodiments, powerline analyzer 322 is configured to monitor the external power supplied by an external power source (e.g., external power source 602), detect anomalies in the external power (e.g., power outages), and monitor the quality of the power supplied by the external power source (e.g., power source 602). In PCD 118, power source 602 may include a power line that delivers electricity from a circuit breaker or other power source within building 100 to PCD 118. In PCD 119, power source 602 may include a power line that delivers electricity from a main power line within building 100 to PCD 119 (e.g., an input power line for a circuit breaker). In such embodiments, powerline analyzer 618 is configured to monitor and collect information associated with the current, frequency, and/or voltage of the power supplied to PCD 118 to detect and/or predict anomalies (e.g., power outages, power surges) in the supplied power. In some embodiments, powerline analyzer 618 is configured to monitor a voltage characteristic and/or a frequency characteristic of the external power to detect a substandard power quality characteristic of the external power (e.g., a powerline anomaly). It should be understood that any number of voltage characteristics or frequency characteristics may be monitored by powerline analyzer 618. A substandard power quality characteristic may include a frequency characteristic and/or a voltage characteristic that differs from a standard power quality characteristic. For example, a standard power quality characteristic for external power supplied in the United States may comprise a standard frequency characteristic of 60 Hz and a voltage characteristic of 120 V. Powerline analyzer 618 communicates with outlet administrator 620 to transmit the collected information to outlet administrator 620. As will be described in greater detail below, outlet administrator 620 uses the received information determine a power decision.

In some embodiments, outlet administrator 620 is configured to monitor and control power supplied to external devices via various electrical outlets provided by PCD 118 (e.g., electrical outlets 308). More specifically, outlet administrator 620 is configured to monitor and control of power supplied to one or more devices that are electrically coupled to the various electrical outlets, according to some embodiments. In PCD 118, outlet administrator 620 may monitor and control power supplied to various devices that can be plugged into electrical outlets 308. In PCD 119, outlet administrator 620 may monitor and control power supplied to various electrical circuits within building 100 via electrical outlets 308 of PCD 119. Accordingly, PCD 118 may further include various hardware components, such as an internal power relay operating as electrical switch to control the flow of power provided to the various electrical outlets. In some embodiments, outlet administrator 620 is configured to monitor the power supplied to the external devices to detect short circuits, determine a location of the shorted circuit, and deny power transmission to a location of the shorted circuit until properly fixed.

As will be described in greater detail with reference to FIG. 7, in some embodiments, outlet administrator 620 is configured to determine, based on an electrical signature, an identity of each device that is electrically coupled to PCD 118. An electrical signature is a unique signature for a particular device comprising the power consumption of the device, voltage signal characteristics (e.g., sine wave, amplitudes, amplitude decay), etc. By collecting such information, the particular device can be identified. In some embodiments, the information is compared to electrical signatures stored in power database 622 in order to identify the device associated with each electrical signature.

In some embodiments, outlet administrator 620 is configured to determine a prohibited device based on the electrical signature. In general, a prohibited device is a device that is not permitted for use within the building in which PCD 118 is used. Upon detecting a prohibited device, outlet administrator 620 may generated a power decision to deny power transmission to the particular outlet in which the prohibited device is plugged. For example, a dorm may prohibit the use of hot plates in the building. Upon identifying that a hot plate is plugged into PCD 118 and consuming power (e.g., the hot plate is operating), outlet administrator 620 will generate the power decision to stop power transmission to the outlet in which the hot plate is plugged.

In some embodiments, power database 622 operates as a database configured to store various power system information. In some embodiments, power database 622 stores one or more restoration schedules that defines an order of restoring power to the various outlets. As previously described, a restoration schedule may be generated based on priority of device, random selection of zones, location, and/or estimated plug upon restoration of power. In some embodiments, power database 622 stores electrical signatures of various devices for use in identifying devices that are plugged into PCD 118. In such embodiments, a device associated with a stored electrical signature is considered allowed or prohibited.

Figure 7:
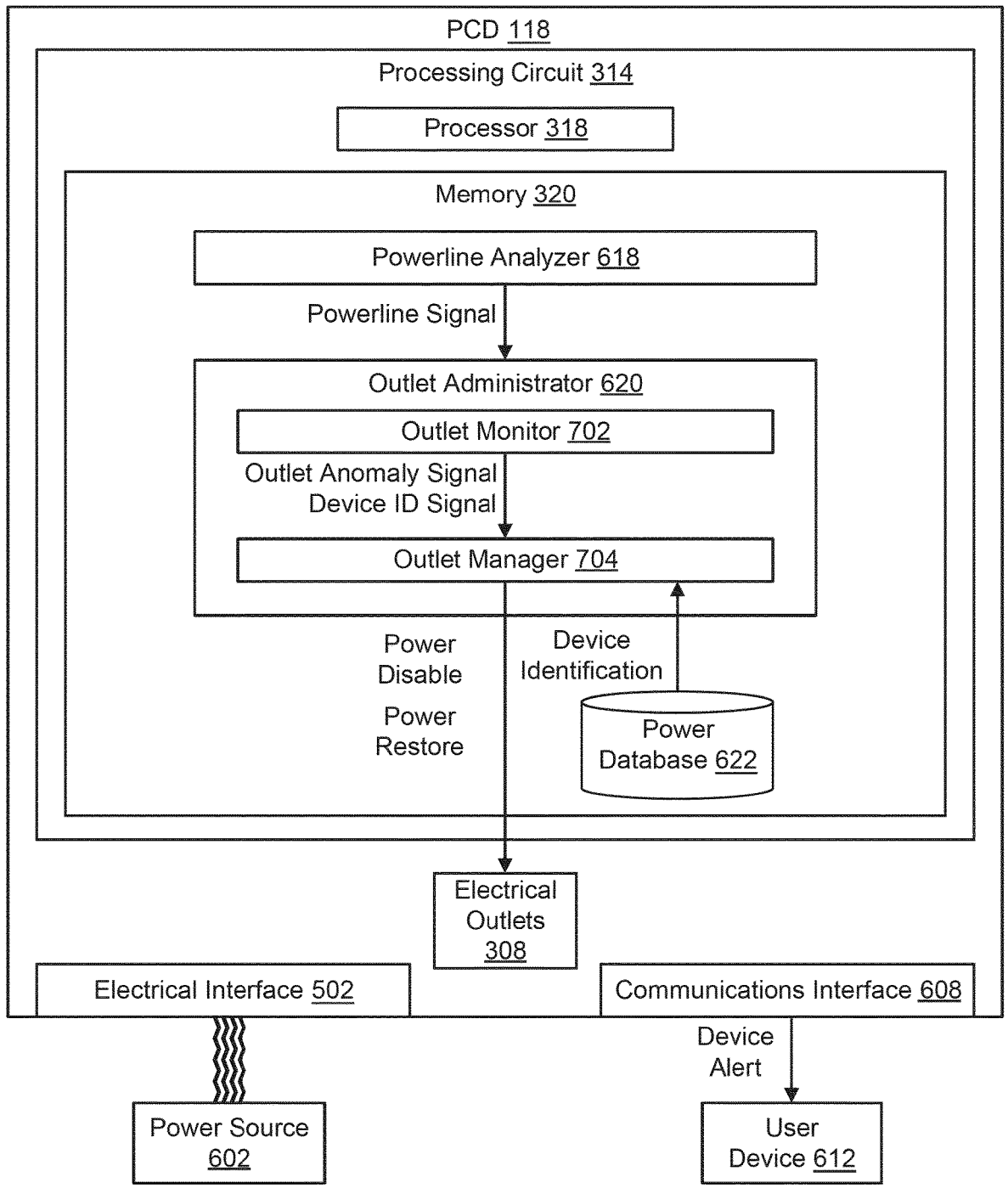
FIG. 7 is a block diagram illustrating an outlet administrator in greater detail, which can be implemented as part of the powerline control device of FIG. 3, according to some embodiments.

Referring now to FIG. 7, a block diagram illustrating outlet administrator 620 in greater detail is shown, according to some embodiments. As previously described, in some embodiments, outlet administrator 620 is configured to facilitate the monitoring and control of power consumed by external devices via one or more outlets (e.g., electrical outlets 308) provided by PCD 118. Outlet administrator 620 is shown to include an outlet monitor 702 configured to monitor power consumed by various devices and an outlet manager 704 configured to control the power supplied to the one or more outlets included in PCD 118, according to some embodiments. In some embodiments, outlet monitor 702 transmits various signals to outlet manager 704. In turn, outlet manager 704 analyzes the various signals transmitted by outlet monitor 702 to determine an appropriate action responsive to the received signal.

Outlet administrator 620 is shown to receive a powerline signal from powerline analyzer 618. As will be described in greater detail with reference to FIG. 8, such a powerline signal may indicate an event (e.g., a power surge, a power outage) in the power supplied to PCD 118. Accordingly, outlet manager 704 may determine, based on the received powerline signal, a power disable decision configured to automatically disable transmission of power to electrical outlets 308. In some embodiments, the powerline signal received by outlet administrator 620 may indicate the power supplied to PCD 118 has returned to normal and/or standard characteristics (following a powerline event). As such, outlet manager 704 may make a power restore decision configured to automatically restore power to electrical outlets 308.

Outlet monitor 702 is configured to monitor (continuously or intermittently) power supplied by electrical outlets 308 to various devices that are electrically coupled to electrical outlets 308, according to some embodiments. More specifically, in some embodiments, outlet monitor 702 monitors the current of the power consumed by various devices which is supplied by electrical outlets 308. In such embodiments, outlet monitor 702 is configured to monitor the current and/or voltage to detect and/or predict outlet anomalies in the power consumed by various devices. Various examples of outlet anomalies include short circuits, excess power consumption by a device, use of a prohibited device, etc. In some embodiments, outlet monitor 702 is configured to measure an amount of power consumed by one or more devices that are electrically coupled to the electrical outlets 308. In such embodiments, outlet monitor 702 reports the power consumption measurements to BMS controller 202. In some embodiments, outlet monitor 702 is configured to detect that a device coupled to the electrical outlets 308 is consuming an idle amount of power. An idle amount of power may be consumed by or transmitted to the device when in a non-operating state. For example, a toaster that is not actively toasting may receive an idle amount of power.

Outlet manager 704 is configured to receive various signals (e.g., an outlet anomaly signal, a device identification signal) from outlet monitor 702 and/or powerline analyzer 618 and analyze the received signals to determine one or more actions in response to received signal, according to some embodiments. As previously described, in some embodiments, outlet manager 704 is configured to identify the various devices using an electrical signature transmitted with a device identification signal associated with the various devices. In such embodiments, outlet manager 704 is configured to identify the various devices by matching a particular electrical signature with a device identification electrical signature stored in power database 622. Further, in some embodiments, outlet manager 704 is configured to detect the use of a prohibited device by identifying a particular device. For example, a student dormitory may prohibit the use of hot plates within the dormitory building. By identifying the use of a hot plate, proper actions, such as turning off the power to the particular outlet to which a hot plate is connected, may be administered. As such, outlet manager 704 is shown to transmit a power disable signal to one or more particular outlets to which the prohibited devices are connected, according to some embodiments. In some embodiments, a device alert is transmitted to user device 612 identifying the one or more particular prohibited devices.

In some embodiments, outlet manager 704 is also configured to user the electrical signatures (e.g., predetermined profiles, expected electrical load variations over time, etc.) to detect anomalous behavior that could lead to a fault, or to detect a fault or a condition that could lead to a fault. In some embodiments, outlet manager 704 is configured to compare the electrical signatures (e.g., expected load variation over time) to actual loads over time (e.g., actual conditions). A non-match or a difference or a change over time (determined by outlet manager 704 based on the comparison) can indicate a changing condition that may be a fault, an anomalous event, or a condition that may lead to a fault. In some embodiments, outlet manager 704 is configured to predict fault occurrences or likelihoods based on deviations of actual electrical loads over time with respect to the electrical signature. For example, if the deviations indicate that the actual load shifts away from the electrical signature (e.g., a predetermined profile indicating proper operation) and towards a fault profile or signature (e.g., a predetermined profile indicating improper operation), outlet manager 704 can determine that a fault occurrence is likely to occur in near future.

Figure 8:
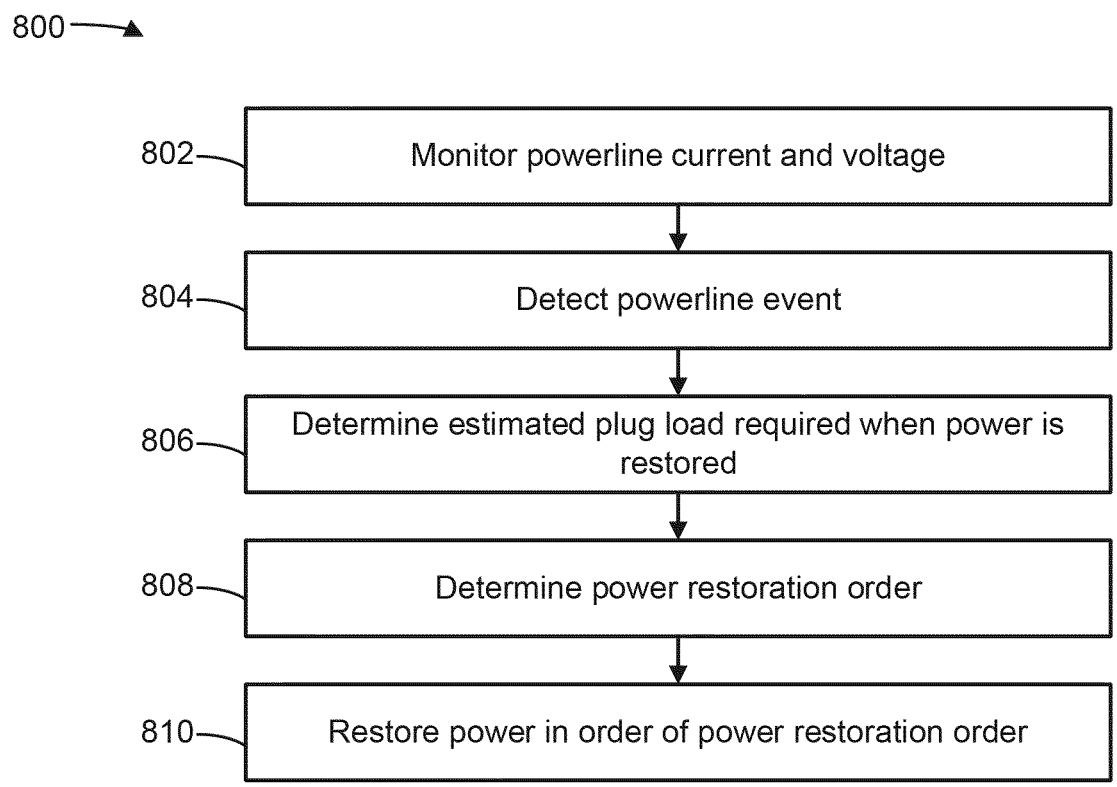
FIG. 8 is a flowchart illustrating a process of monitoring, detecting, and addressing anomalies in a powerline, according to some embodiments.

Referring now to FIG. 8, a process 800 for monitoring power quality of power supplied to a building by an external power source and generating actions in response to an anomaly in the power quality is shown, according to some embodiments. Process 800 can be performed in part by PCD 118 and/or PCD 119 and components included therein, according to some embodiments. As will be described in greater detail below, portions of process 800 can be performed continuously or intermittently in order to facilitate the detection and treatment of powerline anomalies. For example, process 800 may be performed every minute in order to detect and address the presence of a powerline anomaly.

Process 800 is shown to involve monitoring the current and voltage of power supplied by an external power source to a PCD (step 802), according to some embodiments. In some embodiments, step 802 is performed by powerline analyzer 618. In some embodiments, monitoring the current and voltage involves monitoring for changes in the supplied current, frequency, and/or voltage that are greater or less than a particular value associated with a standard value for each of the current and voltage. Such standard values may be 120 V for voltage and 60 Hz for frequency. In some embodiments, monitoring the current, frequency and voltage involves continuously monitoring the power supplied. In some embodiments, monitoring the current, frequency and/or voltage involves intermittently monitoring.

Process 800 is shown to involve detecting a powerline anomaly in the power supplied to a PCD 118 (step 804), according to some embodiments. In some embodiments, step 804 is performed by powerline analyzer 618. Detecting a powerline anomaly involves detecting a change in a value of the current and/or voltage of the supplied power, according to some embodiments. In some embodiments, detecting a powerline anomaly involves determining a power outage based on a reduced value of the current and/or voltage of the supplied power relative to a normal operating value of the current and/or voltage. In some embodiments, detecting a powerline anomaly involves determining external power restoration and/or a power surge based on an increased value of the current and/or voltage of the supplied relative a normal operating value or a prior change in the current and/or voltage. For example, an increase in the current relative a prior change value (e.g., indicating a power outage) may indicate power has been restored.

Process 800 is shown to involve estimating a plug load required when power is restored (step 806), according to some embodiments. In some embodiments, step 806 is performed by outlet administrator 620. In such embodiments, estimating a plug load involves determining a plug load based on the current devices that are plugged into a particular outlet provided by the PCD. Accordingly, based on the current devices plugged into the PCD, an amount of power consumed by the current devices via the particular outlet can be determined.

Process 800 is shown to involve determining power restoration schedule (step 808), according to some embodiments. In some embodiments, determining a power restoration schedule involves retrieving the power restoration schedule received from power database 622. In some embodiments, the power restoration schedule is defined by the amount of power consumed by the one or more devices that are plugged into the one or more PCDs. In such embodiments, the power restoration schedule is determined based on an increasing amount of power consumption order of the one or more devices coupled to each of the one or more PCDs. Accordingly, the one or more PCDs communicate with one another to determine the power restoration schedule based on the estimated plug load determined in step 806 (e.g., power consumption measurements). For example, with reference to FIG. 1A, a first PCD 118, to which microwave 112 is coupled to, may first restore power. A second PCD 118, to which refrigerator 116 is connected to, communicates with the first PCD 118 to determine that the second PCD 118 will restore power following the power restoration to the first PCD 118. As such, it is advantageous to first restore power to a first device that consume less power than second device in order to minimize power surges due to power restoration. As previously described, power restoration schedules may alternately be generated by user-inputted and/or updated based on user preference, randomly-selection, based on location of PCDs within a building, etc.

Process 800 is shown to involve restoring power in the order defined by the power restoration schedule (step 810), according to some embodiments. In some embodiments, restoring power involves outlet manager 704 transmitting a power restoration signal to the one or more electrical outlets based on the order defined by the power restoration schedule. In such embodiments, the transmitted power restoration signal allows for power to be transmitted to the one or more electrical outlets provided by the PCD.

Figure 9:
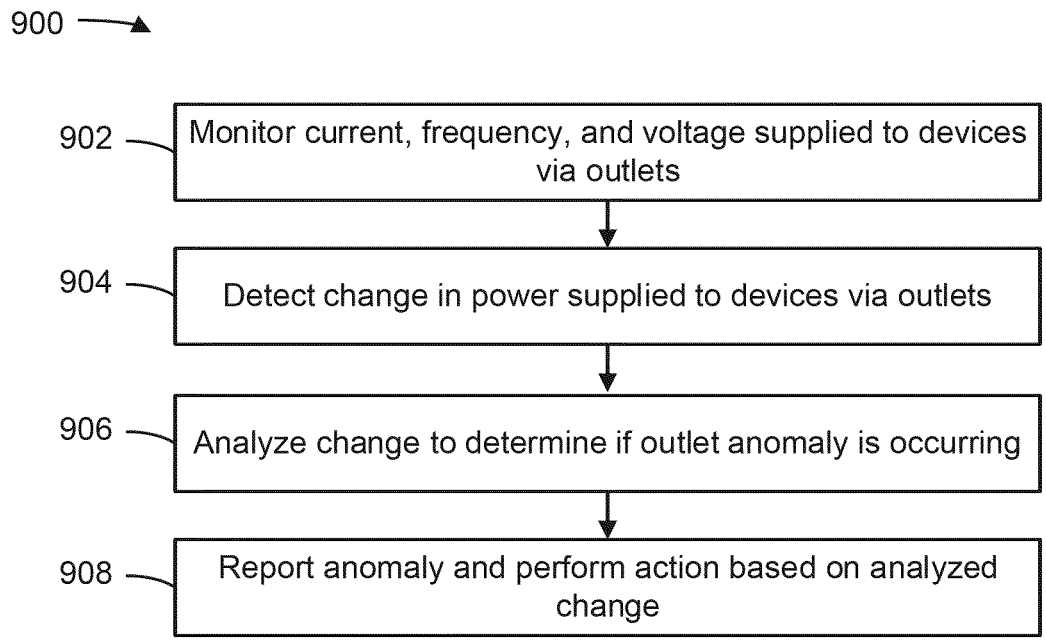
FIG. 9 is a flowchart illustrating a process of monitoring, detecting, and addressing anomalies of power supplied to various devices via electrical outlets, according to some embodiments.

Referring now to FIG. 9, a process 900 for monitoring power consumed by various devices via electrical outlets provided by a PCD and generating power decisions in response to one or more events in the power supplied to the devices via the outlets is shown, according to some embodiments. Process 900 can be performed in part by outlet administrator 620 and components included therein, according to some embodiments. As will be described in greater detail below, portions of process 900 can be continuously or intermittently performed in order to facilitate the detection and treatment of outlet anomalies.

Process 900 is shown to involve monitoring the current, frequency, and voltage of power supplied to various devices via one or more outlets (step 902), according to some embodiments. In some embodiments, step 902 is performed by outlet monitor 702. In some embodiments, monitoring the current, frequency, and voltage involves monitoring for changes in the supplied current, frequency and/or voltage that are greater or less than a standard value. Such standard values may be 120 V for voltage and 60 Hz for frequency. In other embodiments, monitoring the current and voltage involves determining an electrical signature of the power consumed by one or more devices. In some embodiments, monitoring the current and voltage involves continuously monitoring the power supplied. In some embodiments, monitoring the current and/or voltage involves monitoring at an interval (e.g., every 5 seconds, every minute, etc.).

Process 900 is shown to involves detecting a change in power supplied to devices via the electrical outlets (step 904), according to some embodiments. In some embodiments, step 904 is performed by outlet monitor 702. Detecting a change in power supplied to devices via outlets involves detecting a change in a value of the current, frequency, and/or voltage of the supplied power, according to some embodiments. In some embodiments, detecting a change in power supplied to devices via outlets involves determining a short circuit has occurred. In some embodiments, detecting a change in power supplied to devices via outlets involves determining that a device is consuming an amount of power in excess of a predetermined amount. Such a predetermined amount may be an estimated amount of power to be consumed by the device. In some embodiments, step 904 involves detecting a change in power due to a device beginning operation and consuming an amount of power. In such embodiments, step 904 involves identifying a device based on the characteristics of the power consumed by the device. In some embodiments, step 904 involves outlet monitor 702 transmitting a signal indicating the detected change in power to outlet manager 704

Process 900 is shown to involve analyzing the change to determine if an anomaly is occurring (step 906), according to some embodiments. In some embodiments, step 906 involves outlet manager 704 receiving a signal indicating a detected change in power and analyzing the signal. In some embodiments, analyzing the received signal involves comparing current, frequency, and/or voltage values (that were transmitted with the signal) with predetermined current, frequency, and/or voltage values to determine if an anomaly is occurring. As such, if the current, frequency and/or voltage are not approximately equal to predetermined current, frequency, and/or voltage values, then an anomaly is determined to be occurring, according to some embodiments. For example, an excess amount of current may indicate that a short circuit is occurring or an excess amount of power is being consumed by a particular device via a particular outlet. In some embodiments, analyzing the received signal involves comparing an electrical signature associated with a particular device with a stored electrical signature to identify the particular device. In such embodiments, identifying the particular device involves determining that the particular device is considered a prohibited device. As previously described, a prohibited device may be a device that is prohibited for use in a particular building.

Process 900 is shown to involve reporting the determined anomaly and performing an appropriate action based on the particular type of anomaly (step 908), according to some embodiments. In some embodiments, reporting the determined anomaly involves transmitting a message to a user device (e.g., user device 612). The transmitted message may include information such as type of anomaly, location, prohibited device warning, time of occurrence, etc. In some embodiments, step 908 involves transmitting a power decision based on the analyzed change (step 906) to one or more electrical outlet provided by a PCD. In such embodiments, the power decision comprises an action (e.g., disable power, restore power) to be performed. In some embodiments, performing an action involves disabling power transmission to one or more particular outlets where the anomaly was determined to occur. For example, power transmission to a particular outlet at which a short circuit occurred may be disabled until proper maintenance operations can be performed to reset the circuit breaker. In another example, power transmission to particular outlet at which a prohibited device is connected may be disable until the prohibited device is disconnected from the particular outlet.

Referring generally to FIGS. 6-9, it should be understood that any of the components, functionality, or features as described herein with reference to FIGS. 6-9 may be implemented in PCD 119 (described above with reference to FIG. 1B). For example, PCD 119 may include similar or the same structure (e.g., backup battery 604, sensor 606, processing circuit 610, communications interface 608, etc.) as PCD 118 or may be configured to perform process 800 and/or process 900. Any of the description of PCD 118 herein with reference to FIGS. 6-9 may also apply to PCD 119. In some embodiments, PCD 119 can differ from PCD 118 structurally. For example, PCD 119 may be configured as a circuit breaker and may exclude electrical outlet 308 and/or electrical interface 502, or may use different electrical outlets or different electrical interfaces for implementation as a smart circuit breaker.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A power outlet control device, comprising:
   at least one electrical outlet; and
   a processing circuit comprising a processor and memory storing instructions that, when executed by the processor, cause the processor to perform operations comprising:
      monitoring external power supplied to the power outlet control device;
      detecting one or more powerline events based on the external power supplied to the power outlet control device;
      automatically controlling an amount of power supplied to the at least one electrical outlet based on the one or more powerline events; and
      restoring power to the at least one electrical outlet based on a power restoration schedule, the power restoration schedule determined based on an amount of power consumption of a device that consumes the power supplied to the at least one electrical outlet, the power restoration schedule comprising a sequence in which power is restored to the device and one or more other devices which arranges the device and the one or more other devices in ascending order of power consumption.

2. The power outlet control device of claim 1, further comprising a backup battery configured to provide a backup source of power to the power outlet control device.

3. The power outlet control device of claim 1, wherein:
   monitoring the external power supplied to the power outlet control device comprises monitoring a voltage characteristic and a frequency characteristic of the external power; and
   detecting the one or more powerline events comprises detecting a substandard power quality characteristic of the external power based on at least one of the voltage characteristic and the frequency characteristic.

4. The power outlet control device of claim 1, wherein the one or more powerline events comprise a power outage.

5. The power outlet control device of claim 1, wherein the operations further comprise communicating with one or more other power outlet control devices to generate the power restoration schedule, wherein the power restoration schedule defines an order in which the power outlet control device restores power to the at least one electrical outlet relative the one or more other power outlet control devices.

6. A power outlet control device, comprising:
   at least one electrical outlet; and
   a processing circuit comprising a processor and memory storing instructions that, when executed by the processor, cause the processor to perform operations comprising:
      determining an amount of power consumption of a device receiving power from the at least one electrical outlet;
      determining that the power supplied to the device via the at least one electrical outlet is disabled;
      communicating with one or more other power outlet control devices configured to supply power to one or more other devices;
      obtaining a power restoration schedule defining a sequence in which the power outlet control device and the one or more other power outlet control devices restore power supplied to the at least one electrical outlet and one or more other electrical outlets of the one or more other power outlet control devices, the sequence determined based on the amount of power consumption of the device relative to amounts of power consumption of the one or more other devices such that power is restored to the device prior to restoring power to the one or more other devices if the amount of power consumption of the device is lower than the amounts of power consumption of the one or more other devices; and
      automatically restoring power supplied to the at least one electrical outlet in coordination with the one or more other power outlet control devices based on the power restoration schedule.

7. The power outlet control device of claim 6, wherein communicating with the one or more other power outlet control devices comprises transmitting power consumption measurements of one or more devices coupled to the at least one electrical outlet.

8. The power outlet control device of claim 6, the operations further comprising generating the power restoration schedule based on one or more power consumption measurements indicating amounts of power consumption from the power outlet control device and the one or more other power outlet control devices.

9. The power outlet control device of claim 8, wherein generating the power restoration schedule comprises ranking the at least one electrical outlet and the one or more other electrical outlets based on the one or more power consumption measurements and generating the sequence based on the ranking.

10. The power outlet control device of claim 6, wherein automatically restoring power comprises ramping up the power supplied to the at least one electrical outlet based on the restoration schedule.

11. The power outlet control device of claim 6, wherein determining that power supplied to the at least one electrical outlet is disabled comprises detecting a power outage in external power supplied to the power outlet control device.

12. The power outlet control device of claim 11, wherein automatically restoring power supplied to the at least one electrical outlet based on the power restoration schedule is performed in response to determining that the external power supplied to the power outlet control device has been restored.

13. A method for operating a power outlet control device comprising at least one electrical outlet, the method comprising:
 determining an amount of power consumption of a device receiving power from the at least one electrical outlet;
 determining that the power supplied to the device via the at least one electrical outlet is disabled;
 communicating with one or more other power outlet control devices configured to supply power to one or more other devices;
 obtaining a power restoration schedule defining a sequence in which the power outlet control device and the one or more other power outlet control devices restore power supplied to the at least one electrical outlet and one or more other electrical outlets of the one or more other power outlet control devices, the sequence determined based on the amount of power consumption of the device relative to amounts of power consumption of the one or more other devices such that power is restored to the device prior to restoring power to the one or more other devices if the amount of power consumption of the device is lower than the amounts of power consumption of the one or more other devices; and
 automatically restoring power supplied to the at least one electrical outlet in coordination with the one or more other power outlet control devices based on the power restoration schedule.

14. The method of claim 13, wherein communicating with the one or more other power outlet control devices comprises transmitting power consumption measurements of one or more devices coupled to the at least one electrical outlet.

15. The method of claim 13, further comprising generating the power restoration schedule based on one or more power consumption measurements indicating amounts of power consumption from the power outlet control device and the one or more other power outlet control devices.

16. The method of claim 15, wherein generating the power restoration schedule comprises ranking the at least one electrical outlet and the one or more other electrical outlets based on the one or more power consumption measurements and generating the sequence based on the ranking.

17. The method of claim 13, wherein automatically restoring power comprises ramping up the power supplied to the at least one electrical outlet based on the restoration schedule.

18. The method of claim 13, wherein determining that power supplied to the at least one electrical outlet is disabled comprises detecting a power outage in external power supplied to the power outlet control device.

19. The method of claim 18, wherein automatically restoring power supplied to the at least one electrical outlet based on the power restoration schedule is performed in response to determining that the external power supplied to the power outlet control device has been restored.

* * * * *